Feb. 16, 1937.  H. E. LICKFELDT  2,070,606
ROTARY COMBUSTION ENGINE
Filed Feb. 19, 1935  6 Sheets-Sheet 1

Feb. 16, 1937. H. E. LICKFELDT 2,070,606
ROTARY COMBUSTION ENGINE
Filed Feb. 19, 1935 6 Sheets-Sheet 5

Inventor
Harry E. Lickfeldt
By Clarence A. O'Brien
Attorney

Feb. 16, 1937.   H. E. LICKFELDT   2,070,606
ROTARY COMBUSTION ENGINE
Filed Feb. 19, 1935   6 Sheets-Sheet 6

Inventor
Harry E. Lickfeldt
By Clarence A. O'Brien
Attorney

Patented Feb. 16, 1937

2,070,606

UNITED STATES PATENT OFFICE 2,070,606

ROTARY COMBUSTION ENGINE

Harry E. Lickfeldt, Port Huron, Mich., assignor of one-half to Patrick J. O'Rourke, Port Huron, Mich.

Application February 19, 1935, Serial No. 7,287

5 Claims. (Cl. 60—44)

This invention relates to rotary combustion engines.

The primary object of the invention is to arrange a stator block between a pair of rotor members so as to utilize one of the rotor members to compress the charge while the other rotor member is being propelled by the combustion impulse.

Another object of the invention is the positioning of the induction channel and the propelling channel between the confronting faces of the stator block and the respective rotor members thereby eliminating numerous parts that add considerable weight and cost to the construction of engines.

Another feature of the present invention is the development of the maximum of horsepower in a very lightly constructed engine that has very few parts to require repair.

Further objects of the invention are to provide rotary combustion engine that is strong, compact and durable, thoroughly reliable for its intended purpose, very easy to assemble and disassemble and comparatively inexpensive to manufacture and operate.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, variations and modifications may be resorted to without departing from the spirit of the claims hereunto appended.

In the drawings wherein like reference characters indicate like parts throughout the several views.

It is to be understood at the outset that the engine of the present invention is illustrated and described in connection with four firing chambers for the purpose of teaching and explaining the operation of the invention on a small engine adapted for light work. It will be obvious that the firing chambers may be increased as desired where larger engines are required, preferably in multiples of four by increasing the diameter of the stator and rotors. By proper timing of a conventional character, it is the purpose of the present invention to make each chamber fire simultaneously with one another thereby creating four propelling impulses, each time the rotors move through a quadrant of a circle, making sixteen propelling impulses in one revolution of the shaft. With the rotors in one position the four firing chambers will explode simultaneously and propel both rotors through a quadrant and at the same time compression takes place whereupon the four chambers explode the second time when the rotors move under the second four impulses to the second quadrant which action is repeated for the third and fourth quadrants to complete one revolution.

Referring to the drawings in detail, A indicates the metal stator block having smooth opposite faces 21a and 21b except for the projecting bands as will appear later. The stator block is supported on the brackets 20 and the brackets may be secured to a stationary foundation or a mobile frame (not shown) such as in boats or on land vehicles. The stator block is cored as desired to provide cooling water passages 21, 22, Figure 2, on the opposite sides of the four firing chambers 23 which latter extend axially through the margins of the stator block and open at each end into the smooth radial faces of the block.

The center of the stator block is open and the horizontal drive shaft 24 extends through the opening. Keyed to the drive shaft as at 24' to rotate therewith on the intake side of the stator block A is the compression rotor L. The propeller rotor M is keyed to the drive shaft 24 at 25' on the discharge side of the stator block A. The propeller and compression rotors have smooth faces opposed to the smooth radial faces of the block with the exception of the cams to be hereafter described.

On the opposite sides the drive shaft 24 is journaled in thrust bearings 25 bolted to the centers of the closure cap plates 26 having the peripheral flanges 27 bolted to the margins of the stator block A as at 28. A heavy fly wheel or balance wheel (not shown) may be attached to the drive shaft to give the engine momentum in starting to carry the rotors over any dead spots.

Outwardly of each firing chamber 23 is a pocket 29 communicating with the center of the firing chamber and the spark plug 30 is threaded in the peripheral wall of the stator block A one for each chamber. By connecting the spark plugs 30 by an electrical conductor to the conventional distributor (neither of the latter being shown) ignition sparks are simultaneously discharged in the firing chambers at intervals synchronized with the quadrants of the rotor where, as illustrated, the invention is applied to a four chambered stator with the cylinders spaced at quadrants.

The circular intake manifold 31 in the form of a tube, is circumposed about and supported on the periphery of the stator block A and has an extension 32 connected with a liquid hydrocarbon fuel carburetor 33. Extending radially inwardly from the intake manifold through the periphery of the block are four branch passages 35 that open through lateral ports 34 into the induction channel B on the radial intake face of the stator block A. A circular exhaust manifold 36 likewise in the form of a tube, has an outlet 37 and the manifold surrounds the stator block A. Leading from the propelling chamber C on the other smooth radial face of the stator block A through the lateral exhaust ports 38 are branch passages 39 that communicate with the exhaust manifold 36. Intake ports 34 are spaced in a clockwise direction closer to the inlet ends of the firing chambers 23 than are the exhaust ports 38 spaced in a counterclockwise direction from the explosion impulse discharging end of the chambers.

Figure 10:
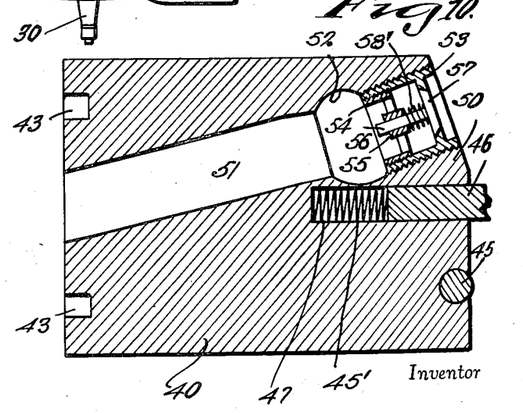
Figure 10 is an enlarged axial section through the inlet valved abutment.
Figure 11:
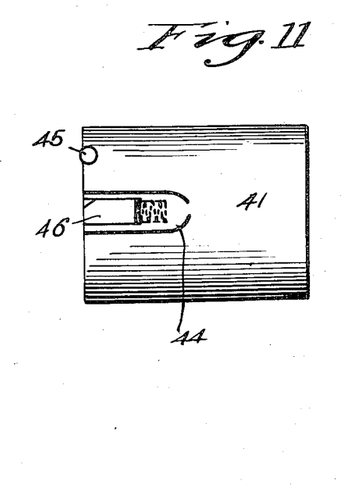
Figure 11 is a side elevation of the outlet valved abutment.

The radial faces forming the inlet and discharge sides of the stator block A are made with a smooth finish. In one end of each chamber 23 are arranged to reciprocate the cylindrical inlet valved abutments 40. Opposed to these are the cylindrical outlet valved abutments 41 likewise reciprocating in the discharge end of the cylinder. This arrangement causes ignition to originate in the space in the firing chamber or cylinder between the confronting ends of the valved abutments and the impulse is transmitted equally therefrom. So as to project the valved abutments to operative position while the engine is at rest in preparation for starting by cranking or other means, a coil spring 42 of only sufficient tension for this purpose is positioned between the confronting ends of the valved abutments with the ends thereof seated in aligned circular grooves 43 (see Figure 10). Both the inlet and outlet valved abutments are recessed for a distance from the outer ends thereof as at 44, one of which recessed sides is shown in Figure 11 and this recessed portion has a wiping engagement with the bands that form the induction and propelling channels as will hereafter appear. The bands bearing against the recessed portion 44 of the valved inlet and exhaust abutments prevent the abutments from turning within the chambers. Both the inlet and the outlet valved abutments have roller bearings 45 at their outer ends that bear on the cams. Seated in the grooves 45' extending inwardly from the outer faces of the inlet valved abutments 40 and the outlet valved abutments 41, one for each of the abutments, are the abutment blades 46 one of which is shown in perspective view in Figure 13 of the drawings. These blades are supported edgewise in the valved abutments across the diameter thereof. The blades 46 are projected by a coil spring 47 in the bottom of each groove pressing against the blade and forcing it outwardly. The leading edges of the blades are beveled as at 48 so as to ride easily over the cams and pass the vane-blades in the cams to be presently described. The side edges 49 are round so as to conform to the relatively round bands of the channels to be presently described.

Figures 5, 9, 13:
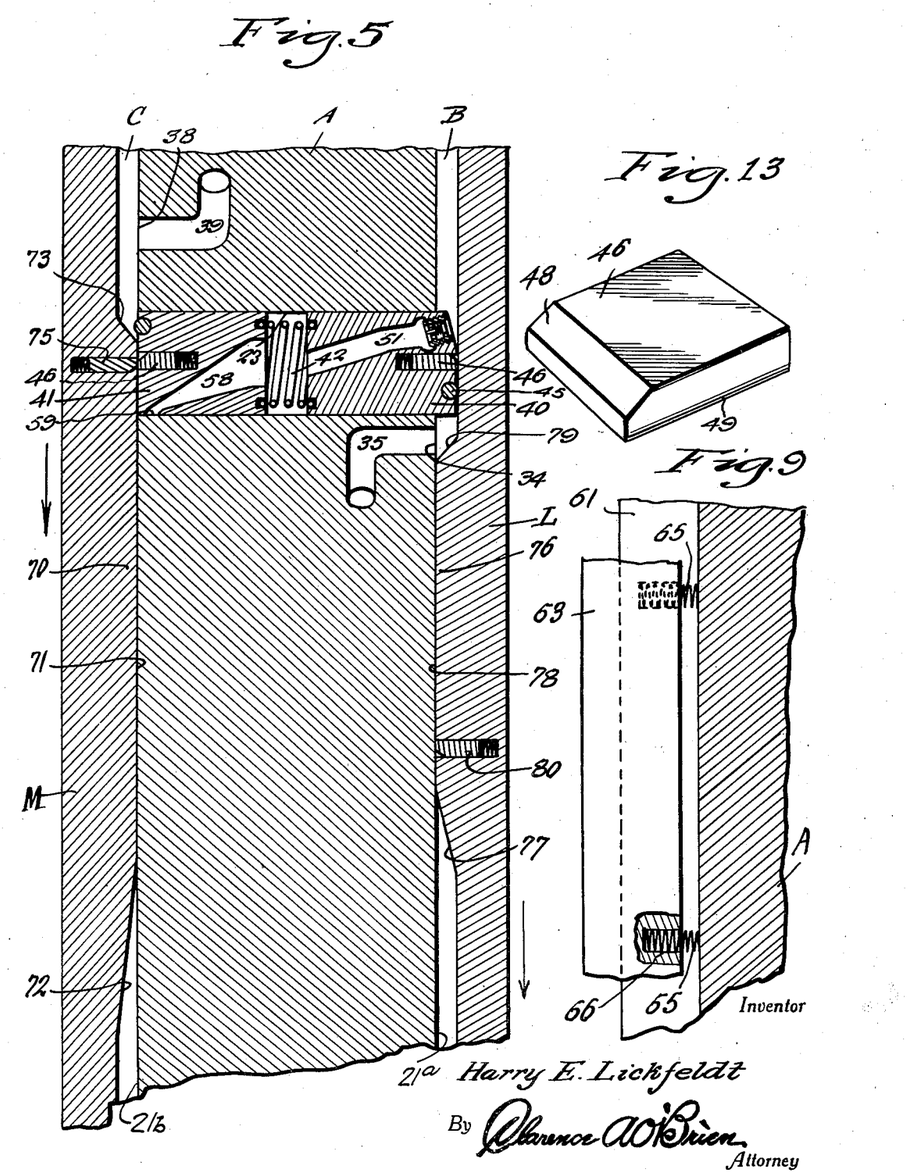
Figure 5 is an enlarged detailed fragmentary vertical sectional view through the stator and rotors taken substantially on line 5—5 of Figure 1, looking in the direction of the arrows and showing the position of the valved abutments, induction and propelling channels at the time the cylinders fire.
Figure 9 is a section taken on line 9—9 of Figure 7.
Figure 13 is a perspective view of one of the blades that may be used in either of the valved abutments or either of the cams.
Figure 18:
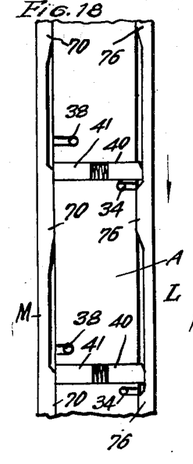
Figure 18 is a fragmentary diagrammatic plan illustrating the position of the parts with relation to one another at the firing stage.

The leading edges of each one of the inlet valved abutments 40 are cut on a bias as at 50 and leading therefrom is the diagonal bore 51 extending through the abutments. Adjacent one end, the bore 51 is considerably widened as at 52 to permit replacement of the poppet valve to be presently described. The outer end of each bore 51 is screw threaded to receive the sleeve valve seat 53 of the poppet valve. The inner end of the sleeve seat 53 is internally threaded to receive the threaded ring 54 which carries at its center the hub 55 through which reciprocates the stem 56 on the disk poppet valve 57 that is normally urged outwardly by the coil spring 58'. When sufficient compression in the compression channel is reached the valve 57 opens and the charge passes through the bore 51 to the center of firing chambers 23 where the spark from the plugs 30 ignite the charge at the properly synchronized time. The relation of the parts at the time of firing is shown in Figures 5 and 18, where the outlet abutments 41 are confined in the ends of the cylinders and the ports 59 are closed. Leading from the inner face, all of the outlet valved abutments 41 are formed with a funnel shaped bore 58, which bore opens outwardly through the trailing side of the abutment in an elongated port 59. The port 59 is spaced inwardly from the end of the outlet valved abutments.

Figures 2, 7, 8:
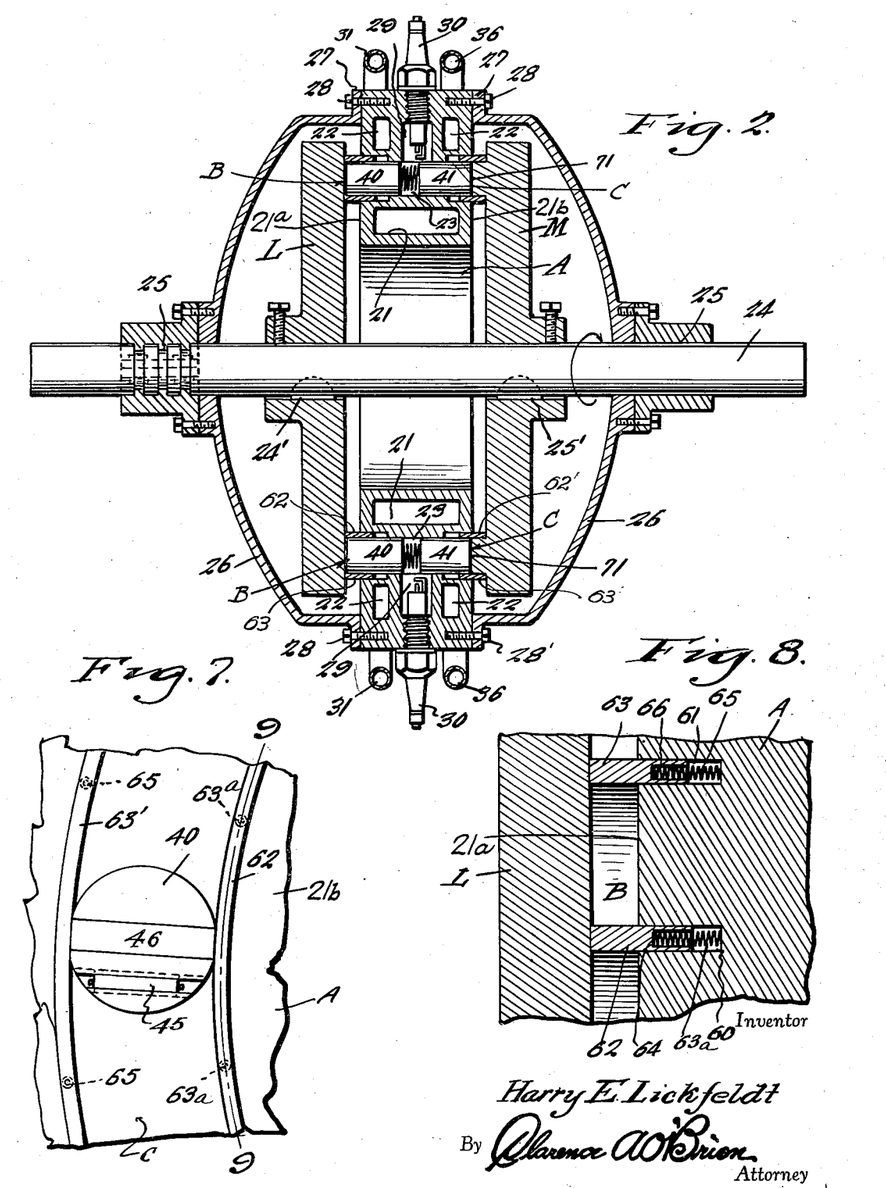
Figure 2 is a detailed vertical sectional view thereof taken substantially on the plane of line 2—2 of Figure 1.
Figure 7 is an enlarged fragmentary face view of the propeller side of the stator block having the propeller rotor removed and showing the propelling channel.
Figure 8 is a fragmentary enlarged section of the rotor and stator on the inlet side showing the induction channel.
Figure 3:
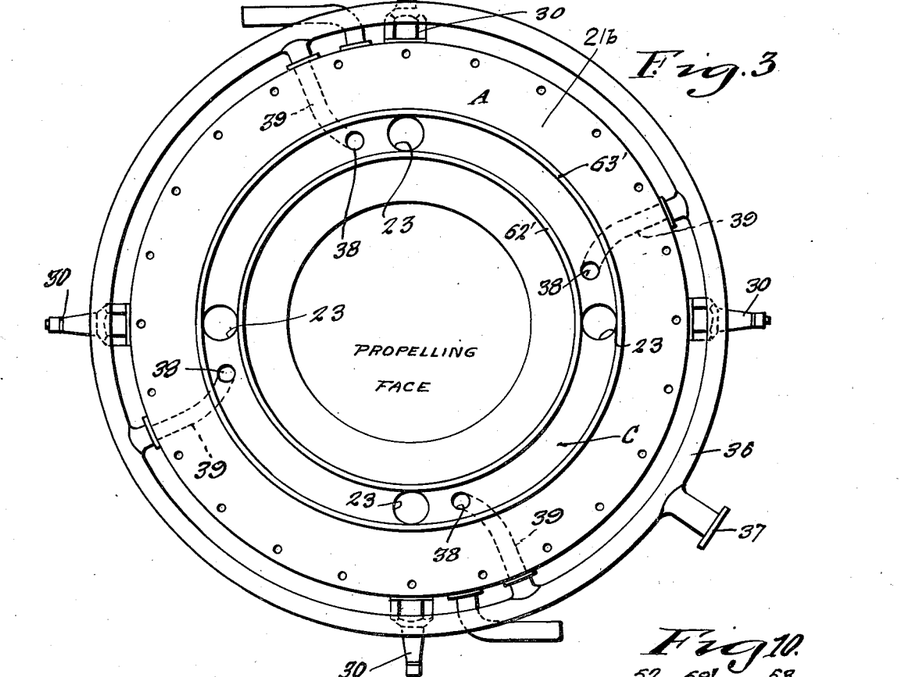
Figure 3 is a face view of the stator block with the propeller rotor removed and on the propelling and exhaust side.

The induction channel B is a circular channel extending continuously about the induction face of the stator block and communicates with the inlet end of the firing chambers 23 and the inlet ports 34. The propelling channel C is a circular channel about the outlet face of the stator block A and this propelling channel is in constant communication with the outlet ports 38 and the outlet ends of the firing chambers. In discharging position all of the outlet ports 59 register with this propelling chamber C as will be understood by referring to Figure 6 of the drawings. Since both of the channels B and C are formed in the same manner, it is believed that a description of the one will give a clear understanding of the other. Referring to Figure 8 of the drawings wherein the induction channel B is elected for illustration there are a pair of inwardly directed continuous circular grooves 60, 61 about the intake side of the stator block A. These grooves 60, 61 are radially spaced from each other and open outwardly through the outer smooth face of the rotor block tangent with the firing chambers 23. Seated in these grooves are the metal bands 62, 63 the inner ends of which reciprocate in the outer portions of the grooves. At spaced points about the grooves are the coil springs 63a projecting the band 62 outwardly and one end of the coil springs 63a engage in pockets 64 in the band. The outer band 63 is likewise projected by the coil spring 65 which bears against the groove at one end and in the pocket 66 at the other end. It will thus be seen that coil springs project the bands 62, 63 outwardly to hold the edges thereof in wiping engagement with the moving compression rotor L and these continuous bands form the radial boundary for the induction or compression channel B. The channel B has for its other boundary the confronting faces respectively of the induction or compression rotor and the inlet face of the stator block A. The bands 62 and 63 are disposed in the respective grooves 60 and 61 in an edgewise direction and these bands straddle the cams on the faces of the induction rotor and the propelling rotor as will presently appear. The propelling channel C is formed like the induction channel B by the bands 62', 63' projecting from the propelling face 21b of the stator block A with their edges in wiping engagement with propeller rotor M and these bands straddle the cams on the propeller rotor as will hereafter appear.

Figures 14, 15:
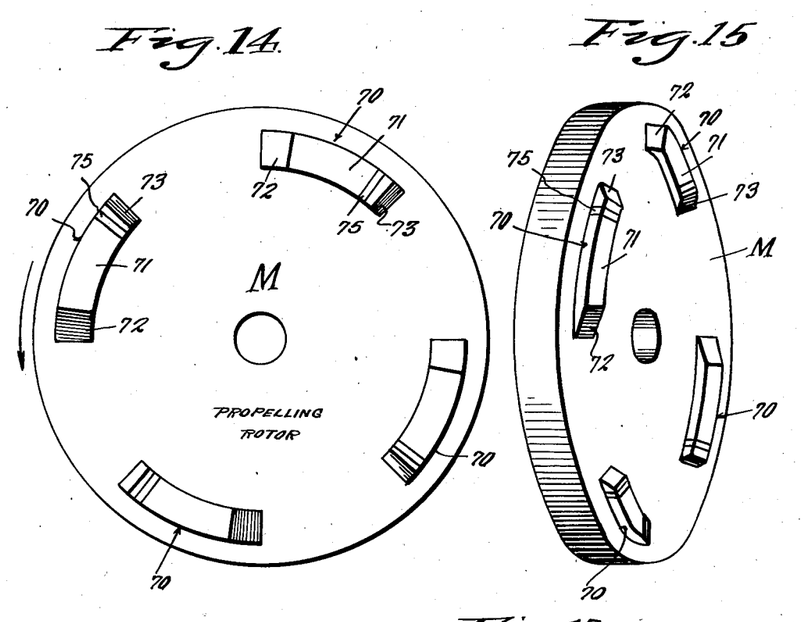
Figures 14 and 15 are respectively the face view and fragmentary perspective view of the propelling rotor removed from the engine.

Referring particularly to Figures 14 and 15 of the drawings, it will be seen that the inner face of the propelling rotor M is smooth. At spaced points about the margin of the smooth face of the propelling rotor M are the cams 70 and these cams are segmental in configuration fitting snugly between the bands 62', 63' that bound the propelling channel C. These cams extend for approximately 45 degrees with a 45 degree space inbetween adjacent cams. The top faces of these cams are smooth for a greater distance than are the cams on the compression rotor. The smooth top faces are indicated at 71. The rotors L and M rotate in a clockwise direction and since the propelling rotor in operative position will be facing opposite to that shown in Figures 14 and 15 the clockwise direction will be in the direction of the arrows.

Each cam 70 on the propelling rotor has an inclined leading end 72 and the trailing end 73 declines abruptly. Adjacent the trailing end there is a retractile blade 75 similar in all respects to the blade 46 shown in Figure 13 of the drawings. This blade 75 forms the vane that has a wiping engagement against the smooth discharge face of the stator block A between the bands 62', 63' of the propelling channel C and the edges of these blades 75 conform to the curvature of the bands and the cams so as to make a compression tight fit in the channel.

Figures 16, 17:
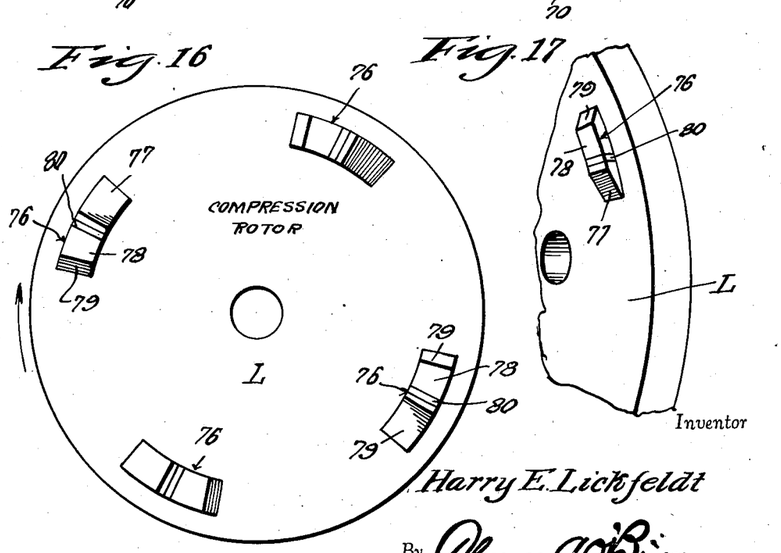
Figures 16 and 17 are respectively the face view and fragmentary perspective view of the compression rotor removed from the engine.

Referring to Figures 16 and 17 where the compression rotor is shown there are spaced cams 76 on the smooth face of the rotor. These cams 76 are segmental in shape and are approximately 30 degrees in extent with a space of approximately 60 degrees between each cam. The leading end of each cam inclines upwardly as at 77 which incline is not so abrupt as in the leading end of the propelling rotor cams. The inclined leading end of the cam merges with a flat face 78 intermediate the ends of the cam and the trailing edge 79 declines abruptly. The cams 76 fit snugly in the induction channel B between the bands that form the channel and these bands straddle the edges of the cams. In the top faces 78 each cam has a projectile blade 80 similar in all respects to the blade shown in Figure 13 of the drawings. This blade forms a snug fit and compression tight joint when the cams ride around in the compression or induction channel B. The ends of the blades at 80 in the compression rotor cams 76 have the same curvature as the cams and the bands of the channels. The leading edges of the blades 75 and 80 are cut on the bias like in Figure 13 so as to ride across the abutment, blades in the abutments, and ports without sluffing the blade away.

Figure 1:
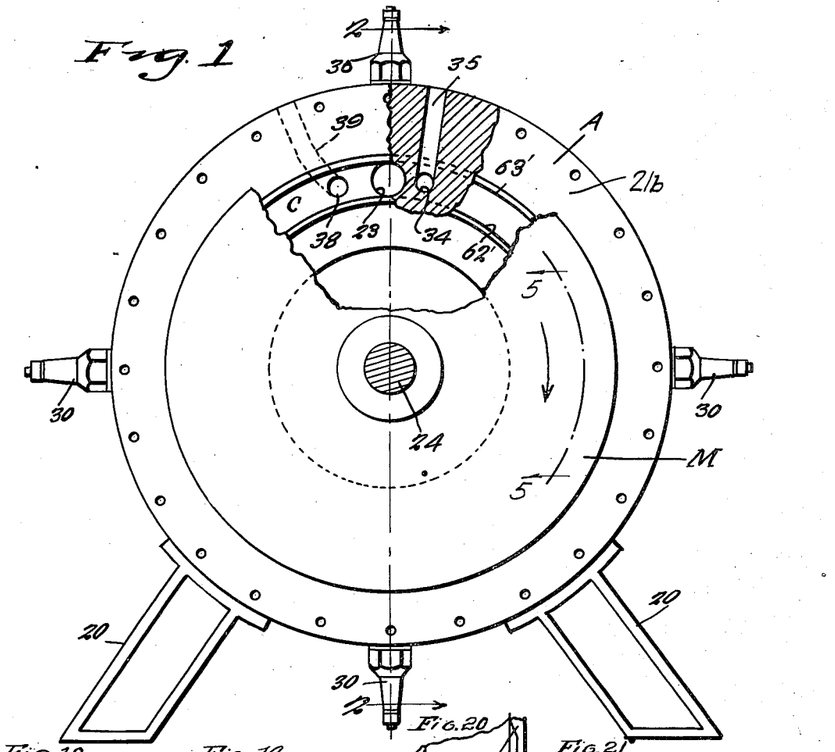
Figure 1 is a side elevation looking at the propelling side of the rotary combustion engine in accordance with the present invention showing the side cap removed, a portion of the propeller rotor broken away, and a portion of the stator block broken away to show an inlet port.

In the operation of the engine, the drive shaft 24 and rotors turn in a clockwise direction facing Figure 1 of the drawings. Tracing the stages of operation, the engine fires with the cams and valved abutments in the approximate position shown in Figure 5 and indicated diagrammatically at Figure 18. In this position, outlet abutments 41 are bearing on the smooth faces 71 of cams 70 retracted into the firing chambers 23 with the discharge ports 59 closed. The space between the cams 70 in propelling channel C is discharging the spent gases through exhaust ports 38. At the point of firing, inlet valved abutments 40 are projected into compression channels B. There is an uncompressed charge in compression channel B in the space between the cams 76 on the rotor L and blades 46 on the abutments 40. All inlet ports 34 are beginning to open and all poppet valves 57 are closed by the force of the exploded charge in chamber 23.

Figures 4, 6, 12:
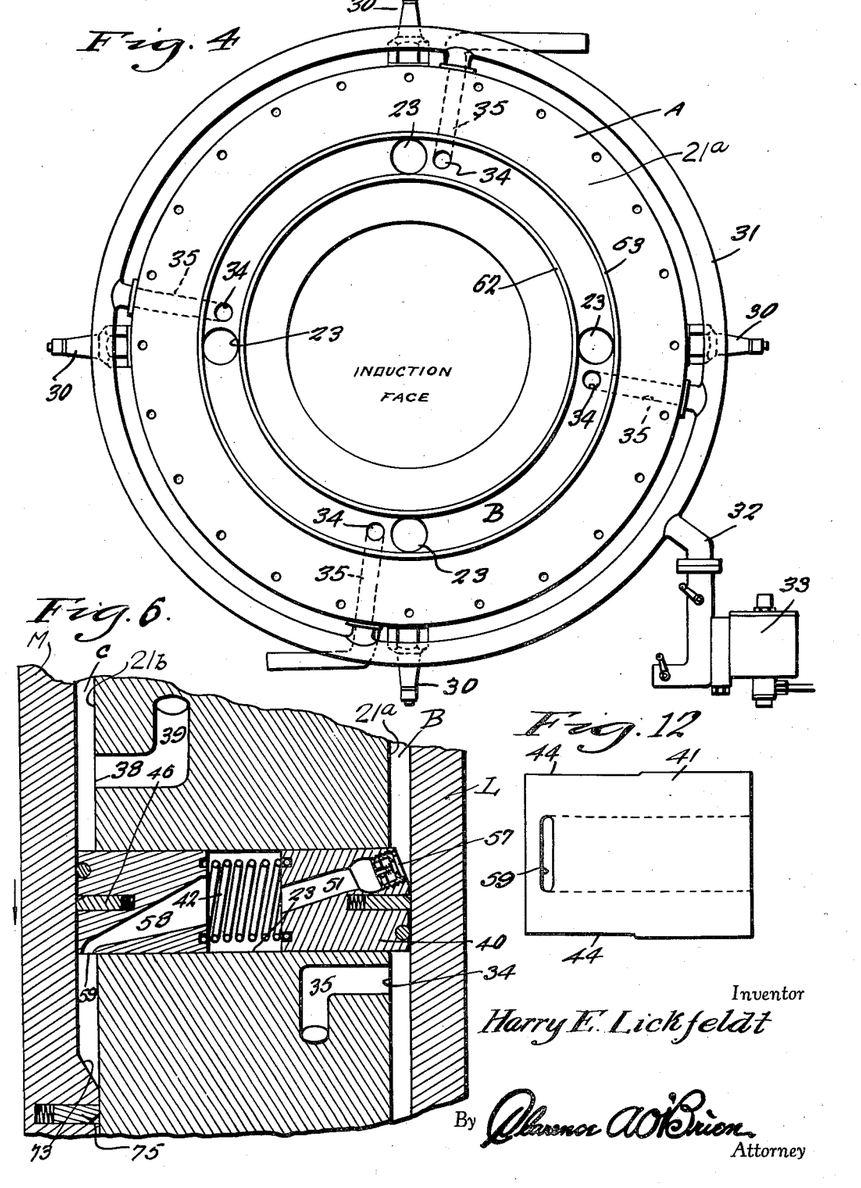
Figure 4 is a face view of the stator block with the compression rotor removed and looking at the compression and intake side.
Figure 6 is a view similar to Figure 5 showing the same parts shortly after firing.
Figure 12 is a side elevation of the outlet valved abutment looking at the outlet port side thereof.
Figure 19:
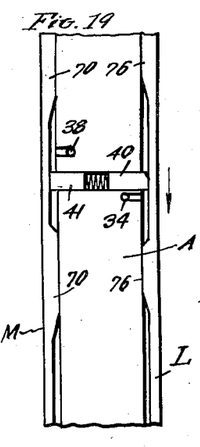
Figure 19 is a fragmentary diagrammatic plan illustrating the position of the parts with relation to one another at the stage where the propelling impulse is being applied.

In Figures 6 and 19 are shown the relation of parts at a point between cams with the combustion impulses discharging through the discharge ports 59 against the trailing shoulders 73 and the projected end of the valved abutments 41 which latter are still baffling and scavaging the remaining spaces between cams 70 in propelling channels C and sending the exhaust gases out through exhaust ports 38. On the compression side, poppet valves 57 are still closed by the force of the combustion impulses remaining in the chambers 23, but the charges have reached a certain degree of compression in the spaces in the compression channels B between the projected inlet abutments 40 and the leading shoulders 77 of the cams 76. The forward ends of the spaces between the trailing ends 79 of the cams 76 and the leading side of the projecting inlet abutments 40 are drawing in a charge through inlet ports 34.

Figure 20:
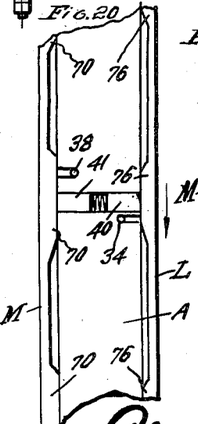
Figure 20 is a fragmentary diagrammatic plan illustrating the position of the parts with relation to one another at the stage of maximum compression just prior to firing.

In Figure 20 is shown the relation of parts at the moment before firing. Both inlet and outlet abutments 40 and 41 are retracted in the chambers by bearing on the smooth faces 71 and 78 of the respective cams 70 and 76, with ports 59 and poppet valves 57 closed and the charge in chambers 23 being in the fully compressed condition preparatory to firing.

Figure 21:
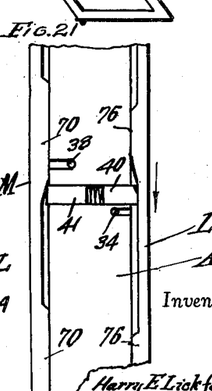
Figure 21 is a fragmentary diagrammatic plan illustrating the parts with relation to one another at the end of the power and compression stage.

In Figure 21 is shown the relation of parts when the compressed charges are sufficient to open poppet valves 57. These charges have been compressed in channels B between the progressively shortening space between the rear sides of the projected inlet valved abutments, and the leading shoulders 77 of the cams 76. While the charges are being compressed at the rear end of the same spaces the forward ends are progressively lengthening and drawing in new charges through inlet ports 34 for the next succeeding impulses. On the propelling side the impulses have been spent and valved abutments 41 have ridden up the leading shoulders 72 on cams 70 until the ports 59 are closed to prevent escape of compression. Exhaust ports are also closed in this position indicated at 19d.

From the foregoing it will be seen that the present invention provides great efficiency and power in a compact arrangement. The engine of the present invention differs from the vane or bucket type engines because work is performed by expansion accompanied by the transference of energy by pressure rather than by the transference of the energy from the velocity. Figuring at the rate of four propelling cams there would be approximately a total area of twelve inches, and assuming that the average mean effective pressure in the propeller channel is two hundred pounds per square inch, which pressure is anticipated to be four hundred pounds per square inch, as an initial pressure at the point of admission into the propelling channels, and with the diameter of the propeller rotor 36 inches at one thousand revolutions per minute, the horse power roughly figuring would be approximately 677, figured as follows:

$$\frac{3 \text{ ft.} \times 3.1416 \times 1000 \times 12 \times 200}{33000} = 677$$

It will be obvious that this is an exceedingly large amount of horse power developed for an engine of this size and weight.

Having thus described the invention, what is claimed as new is:

1. A rotary combustion engine comprising a stator member having opposed side faces and equipped with plural chambers opening through the opposed side faces, a compression rotor and a propeller rotor one being contiguous with one side face and the other being contiguous with the other side face of the stator member, a common drive shaft carrying both rotors and extending through the stator member, opposed valved abutments slidably mounted in the extremities of the chambers in opposed relation and providing combustion chambers in intermediate portions of the chambers between the confronting ends of the abutments, each side face of the stator member formed with a continuous channel confining the ends of the chambers and the abutments when the latter are projected, and spaced cams on segments of each of the rotors slidably seated in the adjacent channel to partition the channel into compartments of variable capacity as the rotors move and at the same time coact with the valved abutments to admit the charge and dispel the combustion impulse.

2. A rotary combustion engine comprising a stator member having opposed side faces and equipped with plural chambers opening through the opposed side faces, a compression rotor and a propeller rotor one being contiguous with one side face and the other being contiguous with the other side face of the stator member, a common drive shaft carrying both rotors and extending through the stator member, opposed valved abutments slidably mounted in the extremities of the chambers in opposed relation and providing combustion chambers in intermediate portions of the chambers between the confronting ends of the abutments, each side face of the stator member formed with a continuous channel confining the ends of the chambers and the abutments when the latter are projected, and spaced cams on segments of each of the rotors slidably seated in the adjacent channel to partition the channel into compartments of variable capacity as the rotors move and at the same time coact with the valved abutments to admit the charge and dispel the combustion impulse, and inlet and outlet ports in the stator member respectively opening into the channels on the leading side of one end of the stator chamber and on the trailing side of the other end of the stator chamber.

3. A rotary combustion engine comprising a stator member having opposed side faces and equipped with plural chambers opening through the opposed side faces, a compression rotor and a propeller rotor one being contiguous with one side face and the other being contiguous with the other side face of the stator member, a common drive shaft carrying both rotors and extending through the stator member, opposed valved abutments slidably mounted in the extremities of the chambers in opposed relation and providing combustion chambers in intermediate portions of the chambers between the confronting ends of the abutments, each side face of the stator member formed with a continuous channel confining the ends of the chambers and the abutments when the latter are projected, and spaced cams on segments of each of the rotors slidably seated in the adjacent channel to partition the channel into compartments of variable capacity as the rotors move and at the same time coact with the valved abutments to admit the charge and dispel the combustion impulse, and inlet and outlet ports in the stator member respectively opening into the channels on the leading side of one end of the stator chamber and on the trailing side of the other end of the stator chamber, and said channels including radially spaced bands yieldingly seated in each side face of the stator member having wiping engagement with the confronting faces of the rotor members and straddling the cams thereon.

4. A rotary combustion engine comprising a stator member formed with spaced chambers opening at the opposite sides thereof, valved abutments mounted in the extremities of the chambers in opposed relation and providing combustion chambers between confronting ends thereof, a pair of rotor members mounted contiguous with and one to each side of the stator member, a continuous channel between the confronting faces of each rotor member and the stator member confining the ends of the chambers, an inlet and outlet port in the stator member for each chamber, and spaced cams on segments of the rotors slidably seated in the adjacent channel to partition the channel into compartments of variable capacity as the rotors move and at the same time coact with the valved abutments to admit the charge and dispel the combustion impulse.

5. A rotary combustion engine comprising a stator member formed with spaced chambers opening at the opposite sides thereof, valved abutments mounted in the extremities of the chambers in opposed relation and providing combustion chambers between confronting ends thereof, a pair of rotor members mounted contiguous with and one to each side of the stator member, a continuous channel between the confronting faces of each rotor member and the stator member confining the ends of the chambers, an inlet and outlet port in the stator member for each chamber, and spaced cams on segments of the rotors slidably seated in the adjacent channel to partition the channel into compartments of variable capacity as the rotors move and at the same time coact with the valved abutments to admit the charge and dispel the combustion impulse, and said channels including radially spaced bands yieldingly seated in each side face of the stator member having wiping engagement with the confronting faces of the rotor members and straddling the cams thereon.

HARRY E. LICKFELDT.